Oct. 15, 1929.   D. I. STONE ET AL   1,731,990
DRUM TRAP CONSTRUCTION
Filed July 15, 1927
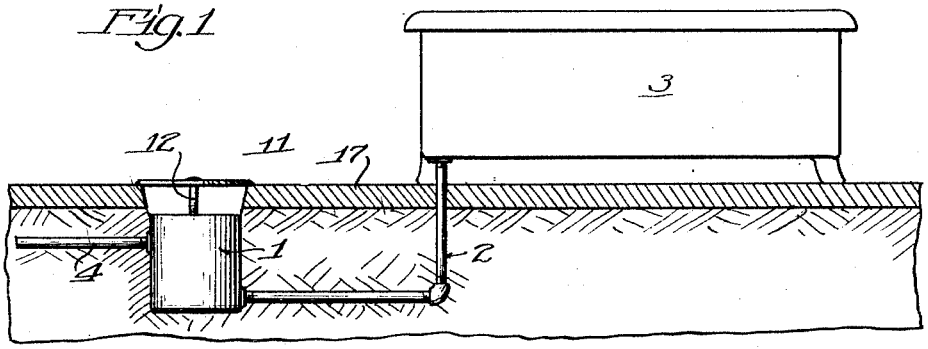
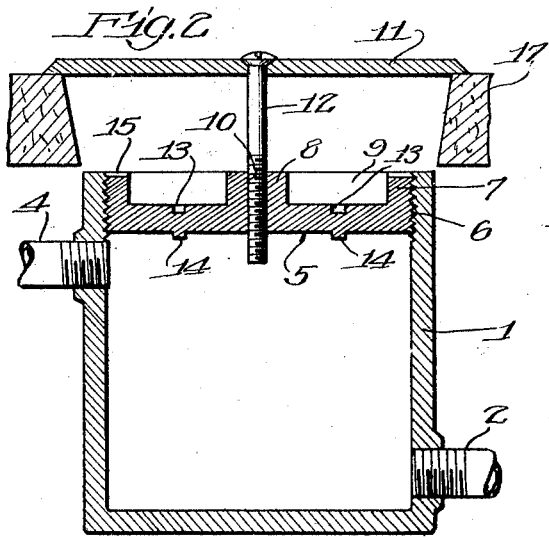
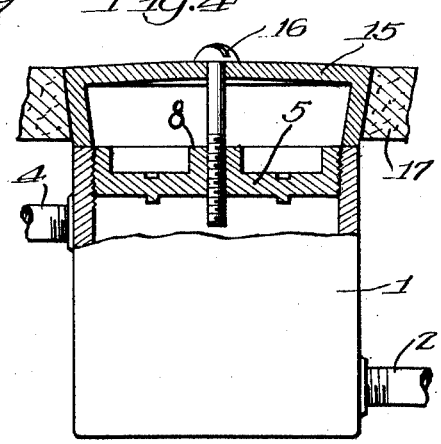
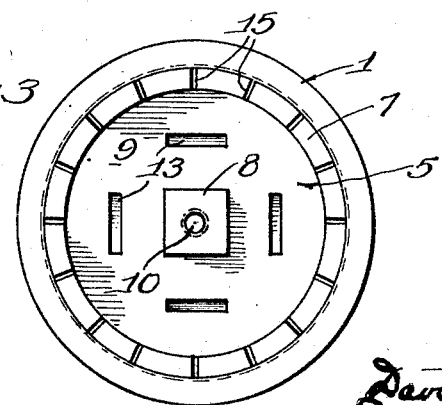

Patented Oct. 15, 1929

1,731,990

UNITED STATES PATENT OFFICE

DAVID I. STONE, OF BERWYN, AND DAVID S. BROWN, OF CHICAGO, ILLINOIS

DRUM-TRAP CONSTRUCTION

Application filed July 15, 1927. Serial No. 205,884.

This invention relates to improvements in drum trap constructions and has for its object to provide a new and improved device of this description.

The invention has as a further object to provide a drum trap construction which will make it unnecessary to cut away portions of the floor in finishing the plumbing job.

The invention has as a further object to provide a simple, cheap and efficient drum trap construction.

The invention has further objects which are more particularly pointed out in the accompanying description.

Referring now to the drawings, Fig. 1 is a view illustrating one form of drum trap construction embodying the invention.

Fig. 2 is an enlarged sectional view through the floor plate and drum trap plug.

Fig. 3 is a plan view of the drum trap plug.

Fig. 4 is a modification.

Like numerals refer to like parts throughout the several figures.

Referring now to the drawings, we have shown a drum trap 1 which is connected by a pipe 2 with a bath tub 3 and which is provided with the outlet 4. A drum trap plug 5 is provided with threads which engage the threaded opening in the drum trap. The drum trap plug 5 is provided with an upstanding edge 7 which extends entirely therearound and an upstanding central portion 8, the edge 7 and the central portion 8 being separated by a depressed portion 9. The plug 5 is provided with a threaded opening 10 which extends through the upstanding central portion 8 and entirely through the plug.

The plug 5 is not provided with a flange. The upstanding central portion 8 may be engaged by a wrench so as to rotate the plug to connect it with or disconnect it from the drum trap. The plug 5 can be used both as a test plug and as a permanent plug so that only one plug for each trap is required. This plug can be placed in the trap before the floor is completed and when the floor is completed, it is not necessary to cut away the floor in order to put in a permanent plug.

The floor plate 11 which covers the opening in the floor above the drum trap is provided with a screw 12 which passes through the threaded opening 10 in the plug. It will be noted that this screw may be screwed entirely through the plug and, therefore, the plate may be pressed in position whatever the distance between the top of the floor and the plug, it only being necessary to provide a screw of sufficient length for the maximum distance. This screw will then be proper for the minimum distance or any intermediate distance of the floor plate 11 as the screw can be thrust through the plug the desired distance to compensate for the difference in distance of the floor plate from the plug in the various installations. In other words, this construction provides an unlimited screw for connecting the floor plate and the plug. The plug 5 may also be provided with tool grooves 13 for a screw driver or the like so that the plug may be rotated to remove it or place it in position. When these tool grooves are provided, the plug is preferably provided with projections 14 on the opposite face so that the grooves do not unduly weaken the plug. The plug may also be provided on the edge 7 with the tool grooves 15 so that a screw driver or the like can be used to rotate the plug.

As hereinbefore stated, the plug 5 may be used as the plug for the drum during the construction work such as the finishing up of the floor and also as the permanent plug. If desired, a rough cap 15 may be provided for covering the plug 5 during the process of construction so as to prevent cement or other material from getting on to the plug. This cap may be hollow and the edge thereof engages the drum trap. As shown in Fig. 4, the cap is held in position by a screw 16. The floor is formed around this cap as shown in Fig. 4. The outer face of the cap is preferably inclined, the cap being larger at the top than at the bottom so that it may be easily removed after the floor is in position. When the cap is removed, the plate 11 may be pressed in position over the hole. It will be seen that by this means, a simple, cheap and effective construction is provided and that there is no necessity of cutting the floor or of doing any other work except to remove the cap and put the plate in position.

We claim:

1. A drum trap construction comprising a drum trap located below a floor opening, a removable plug therefor, a floor plate engaging the edge of the floor opening above the drum trap, a screw connecting the plate with the plug, said screw threaded into said plug and having an adjustable connection with said plug unlimited throughout its length.

2. A drum trap construction comprising a drum trap located below the upper face of a floor, a removable plug therefor, a rough cap projecting upwardly above the plug and removably connected therewith, a portion of the cap being at the floor level so that the floor may be formed therearound, the rough cap enclosing the plug and preventing foreign material from coming into contact therewith.

3. A drum trap construction comprising a drum trap located below the upper face of a floor, a removable plug therefor, a rough cap projecting upwardly above the plug and removably connected therewith, a portion of the cap being at the floor level so that the floor may be formed therearound, the outer face of said cap being inclined outwardly from the bottom toward the top thereof, the rough cap enclosing the plug and preventing foreign material from coming into contact therewith.

4. A drum trap adapted to be located below the floor construction comprising a drum trap, a removable plug having a threaded periphery which engages threads on the interior wall of the drum trap, the greatest diameter of the plug being at the threaded portion thereof whereby the plug may be used both as a temporary plug and a permanent plug, a rough, hollow cap having its lower edge engaging said trap, said rough cap projecting upwardly above the plug and being removably connected therewith, a portion of the cap being at the floor level so that the floor may be formed therearound, the rough cap enclosing the plug and preventing foreign material from coming into contact therewith.

Signed at Chicago, Illinois, this 28th day of June, 1927.

DAVID I. STONE.
DAVID S. BROWN.